(12) United States Patent
Wiest et al.

(10) Patent No.: US 11,448,538 B2
(45) Date of Patent: Sep. 20, 2022

(54) CLAMP-ON ULTRASONIC FLOWMETER AND METHOD FOR ADJUSTING TRANSDUCER ELEMENTS USING AN ADJUSTING DEVICE HAVING AT LEAST TWO DEGREES OF FREEDOM

(71) Applicant: Endress+Hauser Flowtec AG, Reinach (CH)

(72) Inventors: Achim Wiest, Weil am Rhein (CH); Oliver Brumberg, Rheinfelden (DE); Andreas Berger, Erschwil (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 106 days.

(21) Appl. No.: 16/956,503

(22) PCT Filed: Nov. 14, 2018

(86) PCT No.: PCT/EP2018/081238
§ 371 (c)(1),
(2) Date: Jun. 19, 2020

(87) PCT Pub. No.: WO2019/120773
PCT Pub. Date: Jun. 27, 2019

(65) Prior Publication Data
US 2021/0080303 A1    Mar. 18, 2021

(30) Foreign Application Priority Data
Dec. 21, 2017   (DE) ................. 10 2017 130 976.4

(51) Int. Cl.
G01F 1/66       (2022.01)
G01F 1/667      (2022.01)
G01F 15/18      (2006.01)

(52) U.S. Cl.
CPC .............. *G01F 1/667* (2013.01); *G01F 1/662* (2013.01); *G01F 15/185* (2013.01)

(58) Field of Classification Search
None
See application file for complete search history.

(56) References Cited

U.S. PATENT DOCUMENTS 4,680,967 A * 7/1987 Rost ................ G01N 29/28
                                                73/644
5,437,194 A * 8/1995 Lynnworth ......... G01F 1/662
                                                73/861.27

(Continued)

FOREIGN PATENT DOCUMENTS

CN    103459988 A    12/2013
CN    105300462 A    2/2016

(Continued)

*Primary Examiner* — Harshad R Patel
(74) *Attorney, Agent, or Firm* — Kelly J. Smith; Endress+Hauser (USA) Holding Inc.

(57) ABSTRACT

A clamp-on ultrasonic flowmeter includes a measuring tube, a pair of ultrasonic contact transducers, and an electronic measuring/operating circuit for operating the transducers. Each transducer includes a transducer element for generating and detecting ultrasonic signals and a coupling element. The transducer element is located on one side of the coupling element facing away from the measuring tube, and is designed to be acoustically coupled to the measuring tube via another side of the coupling element facing the measuring tube, and designed to transmit ultrasonic signals between the transducer element and measuring tube. The ultrasonic flowmeter comprises an adjusting device for at least one transducer for adjusting the transducer. The adjusting device is arranged and configured to modify at least one angle of the signal path with respect to the coupling face or a signal path length, wherein the adjusting device has at least two degrees of freedom.

11 Claims, 6 Drawing Sheets (56) References Cited

U.S. PATENT DOCUMENTS

| | | | |
|---|---|---|---|
| 9,188,468 B2* | 11/2015 | Rath | G01F 1/662 |
| 2003/0172743 A1 | 9/2003 | Ao et al. | |
| 2007/0151364 A1* | 7/2007 | Wiest | G01F 1/663 |
| | | | 73/861.27 |
| 2010/0046576 A1* | 2/2010 | Desai | G01N 29/2487 |
| | | | 374/119 |
| 2015/0160053 A1 | 6/2015 | Baumoel | |
| 2017/0132997 A1* | 5/2017 | Wiest | G10K 9/122 |
| 2017/0328869 A1* | 11/2017 | Miki | G01N 29/04 |

FOREIGN PATENT DOCUMENTS

| | | |
|---|---|---|
| DE | 102006000693 A1 | 7/2007 |
| EP | 0408148 A1 | 1/1991 |
| FR | 1065907 A | 5/1954 |
| FR | 1065907 A1 | 5/1954 |
| JP | 2002139357 A | 5/2002 |
| JP | 2005030897 A | 2/2005 |
| JP | 2009216496 A | 9/2009 |
| WO | 2014191136 A1 | 12/2014 |

\* cited by examiner

CLAMP-ON ULTRASONIC FLOWMETER AND METHOD FOR ADJUSTING TRANSDUCER ELEMENTS USING AN ADJUSTING DEVICE HAVING AT LEAST TWO DEGREES OF FREEDOM

CROSS-REFERENCE TO RELATED APPLICATIONS

The present application is related to and claims the priority benefit of German Patent Application No. 10 2017 130 976.4, filed on Dec. 21, 2017 and International Patent Application No. PCT/EP2018/081238, filed on Nov. 14, 2018 the entire contents of which are incorporated herein by reference.

TECHNICAL FIELD

The present application is in the field of ultrasonic transducers.

BACKGROUND

Clamp-on ultrasonic flowmeters are used, for example, if flows of media with a high temperature and/or corrosive properties need to be measured through pipelines, where the use of ultrasonic contact transducers in the pipeline would be unsuitable. Moreover, this avoids the relatively complex manufacturing of measuring tubes with receptacles for ultrasonic contact transducers. However, clamp-on ultrasonic flowmeters require aligning the ultrasonic contact transducers of the clamp-on ultrasonic flowmeter with one another, wherein the optimum alignment relative to each other depends upon acoustic properties of the measuring tube and of the medium. The prior art DE 102006000693A1 discloses clamp-on ultrasonic flowmeters in which a tilting device can be used to tilt a beam path of the ultrasonic signals in a plane comprising a measuring tube axis. However, it has been found that this tilting allows only insufficient alignment of the ultrasonic contact transducers with each other.

SUMMARY

The aim of the invention is therefore to propose a clamp-on ultrasonic flowmeter with an improved and robust ability to align the ultrasonic contact transducers, as well as a corresponding method for adjusting the clamp-on ultrasonic flowmeter.

A clamp-on ultrasonic flowmeter according to the invention comprises a measuring tube for guiding a medium;

a pair of ultrasonic contact transducers which, along a measuring tube axis, are arranged on the measuring tube offset from each other; and an electronic measuring/operating circuit for operating the ultrasonic contact transducers and for generating flow measurement values, wherein each ultrasonic contact transducer has at least one transducer element, especially, a piezoelectric element for generating and detecting ultrasonic signals, and a coupling element, wherein the transducer element is located on a first side of the coupling element, said side facing away from the measuring tube, and wherein the coupling element is designed to be acoustically coupled to the measuring tube via a second side of the coupling element, said second side facing the measuring tube, and to transmit ultrasonic signals between the transducer element and measuring tube and vice versa, wherein the ultrasonic flowmeter, for at least one first ultrasonic contact transducer of the pair, has an adjusting device for adjusting the ultrasonic contact transducer, wherein the adjusting device is arranged between the transducer element and the first side of the coupling element or between the measuring tube and the second side of the coupling element, and has a coupling face directed towards the measuring tube, characterized in that the adjusting device is configured to modify at least one angle of a signal path with respect to the coupling face and/or a signal path length, wherein the adjusting device has at least two independent degrees of freedom, wherein the adjusting device is acoustically and mechanically coupled to the coupling element and the transducer element or measuring tube.

The clamp-on ultrasonic flowmeter can be based, for example, on the time transit principle.

In one embodiment, the adjusting device has at least three, linearly independent degrees of freedom.

In one embodiment, a first degree of freedom is configured to tilt the signal path by a first angle $\beta 1$, relative to the coupling face, in a first plane perpendicular to the coupling face, and/or wherein a second degree of freedom is configured to tilt the signal path by a second angle $\beta 2$, relative to the coupling face, in a second plane perpendicular to the coupling face, and/or wherein a third degree of freedom is configured to set the signal path length.

The first plane is preferably perpendicular to the second plane.

The third degree of freedom makes it possible to match the signal transit times in the ultrasonic contact transducers, which allows simplified and more robust signal processing when calculating flow measurement values.

In one embodiment, the ultrasonic flowmeter has the adjusting device for each ultrasonic contact transducer of the pair.

If only one adjusting device is used for adjusting, the flowmeter can be optimized only to a local optimum. The placement of such an adjusting device at each ultrasonic contact transducer allows for very good adjustment of the flowmeter.

In one embodiment, the transducer element has a piezoelectric element, which piezoelectric element is segmented into segments, each segment being individually controllable, wherein the segmentation is, especially, an angular segmentation or a linear segmentation along the measuring tube axis.

In one embodiment, the adjusting device has a deformable element and a deformation device, wherein the shape of the deformable element is directly or indirectly adjustable by the deformation device, wherein the deformation device has, for example, a screw device or an actuator device.

In one embodiment, the actuator device has at least one, and, especially, at least 3, piezoelectric elements, wherein the at least one piezoelectric element is arranged in an edge region of the deformable element.

In one embodiment, the adjusting device has at least two wedges, each having two end faces and one edge face, wherein the wedges are acoustically and mechanically coupled via an inner end face in each case, wherein a first wedge is acoustically and mechanically coupled to the coupling element via an outer end face, and a second wedge is acoustically and mechanically coupled to the transducer element or the measuring tube via an outer end face, wherein the wedges are mounted such that they can rotate relative to one another and relative to the transducer element or the measuring tube.

In one embodiment, acoustic impedances of the transducer element, the coupling element, and the adjusting device deviate from one another by less than 50%, wherein, especially, a sequence of the impedances along a signal path through the transducer element, the coupling element, and the adjusting device is monotonically decreasing or monotonically increasing.

In one embodiment, the measuring/operating circuit is configured to operate the adjusting device and to adjust the flowmeter during the measurement operation.

Various settings of the at least one adjusting device are set in a method according to the invention, wherein, for each setting, an amplitude and/or phase and/or time duration of at least one ultrasonic signal generated by a first ultrasonic contact transducer is measured by means of a second ultrasonic contact transducer, wherein a setting comprises a selection of values from the magnitudes representing the at least two degrees of freedom, wherein the amplitude or the bandwidth is maximized or the time duration is minimized, wherein the adjustment is carried out before or during a measurement process.

Establishing a setting comprises modifying at least one degree of freedom of the adjusting device. Through slow modification of the setting, which modification is significantly slower than a repetition rate of the ultrasonic signal, the ultrasonic flowmeter can be adjusted during the measurement operation without disturbing the measurement. A slight modification of the setting between and/or during successive ultrasonic signals causes only small changes in the signal received by the receiving ultrasonic contact transducer and thus does not limit measurement.

In such a case, a change in an ultrasonic signal amplitude caused by a modification of the setting of the adjusting device is smaller than 5%, and, especially, smaller than 2% and preferably smaller than 1%.

BRIEF DESCRIPTION OF THE DRAWINGS

FIGS. 1 a) and b) show examples of an ultrasonic contact transducer with an adjusting device according to the present disclosure;

FIGS. 2 a) and b) as well as FIG. 3 schematically represent modes of operation of adjusting devices according to the present disclosure;

FIGS. 6 a) through c) show various embodiments of a transducer element.

DETAILED DESCRIPTION

Figure 1:
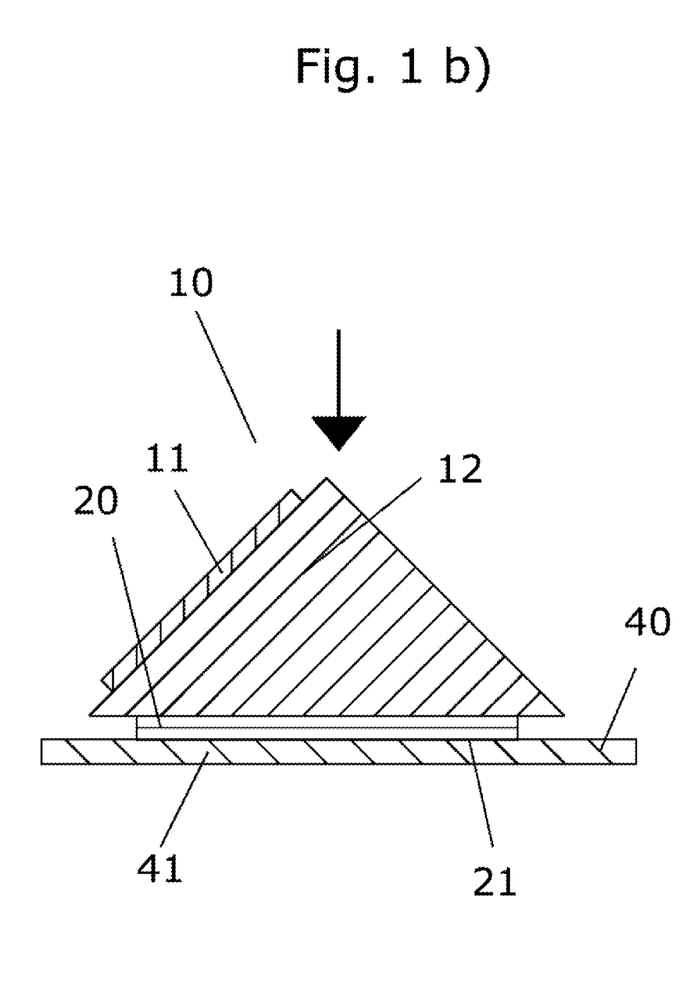

FIG. 1 a) shows an ultrasonic contact transducer 10 attached to a measuring tube wall 41 of a measuring tube 40 of an ultrasonic flowmeter, where an adjusting device 20 according to the invention is arranged between a transducer element 11 and a coupling element 12 of the ultrasonic contact transducer. FIG. 1 b) shows a further ultrasonic contact transducer 10 wherein the adjusting device 20 is now arranged between the coupling element 12 and the measuring tube 40. The adjusting device has a coupling face 21 which is acoustically and mechanically coupled to the coupling element 12 or to the measuring tube. The transducer element 11 is configured to generate and receive ultrasonic signals, wherein, in the case of FIG. 1 a), a generated ultrasonic signal is first coupled into the adjusting device and then passes through the coupling element 12 to the measuring tube, and, in the case of FIG. 1 b), the signal is first coupled into the coupling element 12 from the ultrasonic contact transducer and then passes via the adjusting device to the measuring tube. The arrows shown in FIGS. 1 a) and b) each show a line of sight onto the coupling face 21, as shown in FIGS. 4 a) and b).

Figure 2:
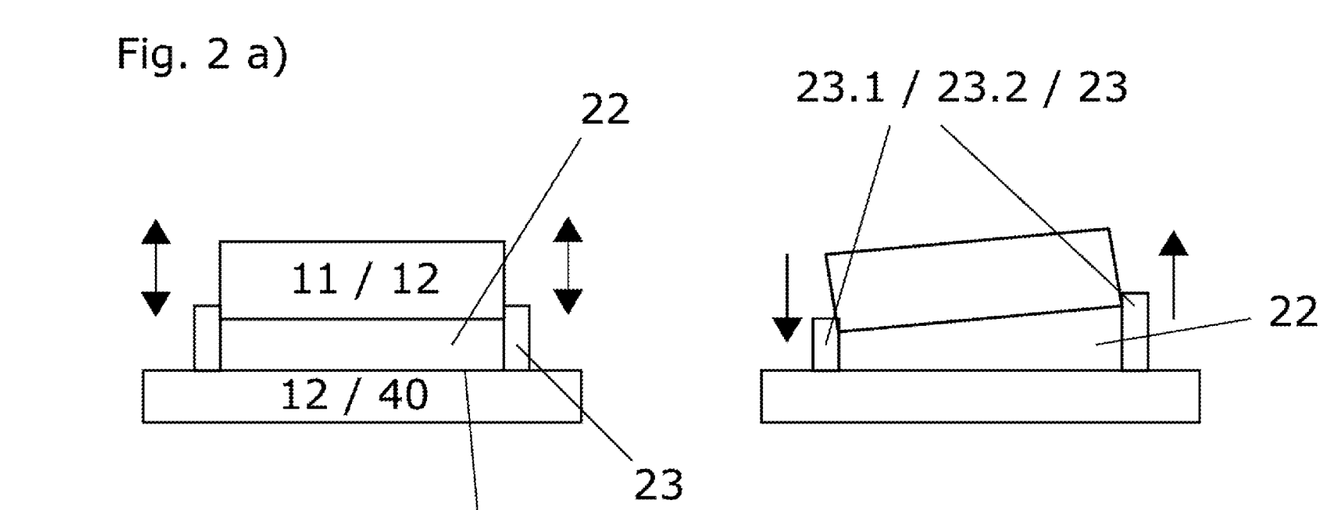

FIGS. 2 a) and b) schematically represent the modes of operation of adjusting devices having a deformable element 22 and a deformation device, e.g., a screw or actuator device for deforming the deformable element 22. The deformable element can be, for example, a silicone cushion which is clamped between the transducer element and coupling element or between the coupling element and measuring tube, or a liquid, which liquid is encapsulated between transducer element 11 and coupling element 12 or between coupling element 12 and measuring tube 40. It is also possible to use a gel pad or an elastomer. A shape of the deformable element 22 can be set by means of the deformation device. A silicone cushion is largely free in how it can be deformed, though conservation of volume is a constraint on the silicone cushion's deformability. Through actuation of the deformation devices 23 in opposite directions, the transducer element or coupling element can be tilted relative to the coupling face, and therefore to an ultrasonic signal path. If the deformation elements are actuated in the same direction (not shown), a distance between transducer element and coupling element or between coupling element and measuring tube, and therefore a signal path length of the ultrasonic signal between an ultrasonic contact transducer pair of a clamp-on ultrasonic flowmeter, can be set. As shown in FIG. 2 b), the adjusting device can have a plate-shaped element 23.3 to increase the mechanical stability between the transducer element or coupling element and the deformable element 22.

Figure 3:
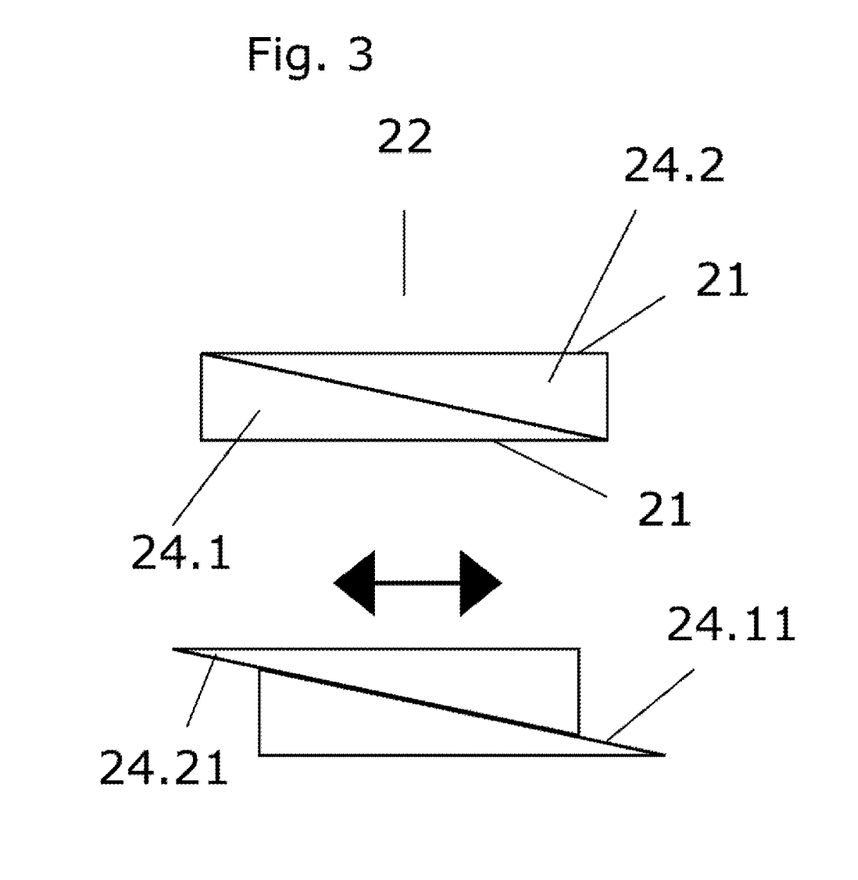

FIG. 3 schematically represents another possibility for configuring a deformable element of an adjusting device. Here, a first wedge 24.1 and a second wedge 24.2 are brought into contact via inner end faces 24.11, 24.21. Through displacement of the wedges relative to one another, a height of the deformable element 22 and therefore the signal path length can be adjusted. A tilt angle and thus an ultrasonic signal path can be set by rotating the wedges relative to one another. The coupling face is an outer end face of the first wedge or of the second wedge, depending upon whether the wedges 24 in FIG. 1 a) or those in FIG. 1 b) are used.

Figure 4:
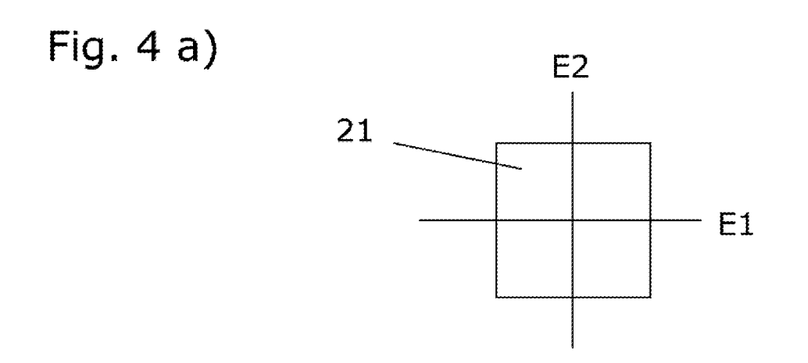
FIG. 4 shows effects of settings of degrees of freedom on the radiation angle of a signal path.

FIG. 4 a) schematically represents the coupling face 21 and the positions of planes E1 and E2, which are orthogonal to the coupling face and orthogonal to one another, wherein a first angle β1 of the ultrasonic signal path parallel to the first plane E1 can be set by setting a first degree of freedom of the adjusting device, and wherein a second angle β1 of the ultrasonic signal path parallel to the second plane E1 can be set by setting a second degree of freedom of the adjusting device; see FIG. 4 b).

Thus, an adjusting device according to the invention can have three degrees of freedom, wherein a first degree of freedom and a second degree of freedom each make it possible to adjust an angle of the signal path after it exits the adjusting device 20, and wherein a third degree of freedom makes it possible for a signal path length to be set. An adjusting device according to the invention must have at least two degrees of freedom, wherein one degree of freedom corresponds to the third degree of freedom. The other degree of freedom in each case advantageously makes it possible to set an angle which lies in a plane comprising a measuring tube axis.

Figure 5:
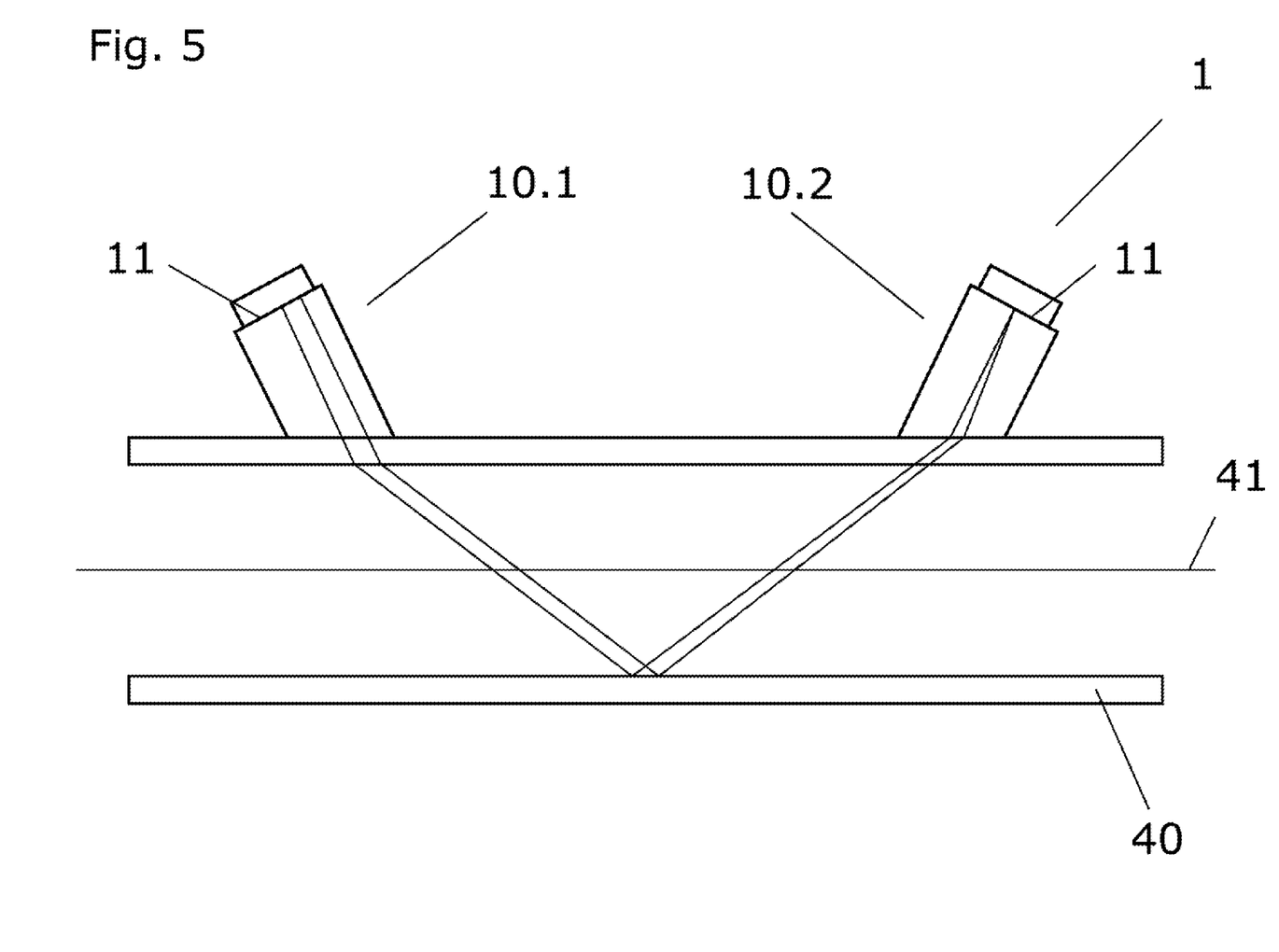
FIG. 5 schematically represents effects of a poorly adjusted ultrasonic contact transducer pair of a clamp-on ultrasonic flowmeter.

FIG. 5 shows, by way of example, a good adjustment and a poor adjustment of two ultrasonic contact transducers of an ultrasonic flowmeter by means of two exemplary signal paths that emanate from a second ultrasonic contact transducer 10.2 of a clamp-on ultrasonic flowmeter 1 and end at a first ultrasonic contact transducer 10.1. Ultrasonic signals usually expand after being radiated by means of an ultrasonic contact transducer, and change their spatial form. In a cross-section of such an ultrasonic signal, perpendicular to the propagation direction, there is a region with maximum signal amplitude. The signal path of an ultrasonic signal is depicted along its propagation direction through the region of maximum signal amplitude. A first signal path sketched in FIG. 5 strikes an edge region of the transducer element of the first ultrasonic contact transducer. In such a case, signal energy is also lost because regions of an ultrasonic signal with high signal energy are not received by the ultrasonic contact transducer. Optimal setting of the ultrasonic contact transducers 10.1 and 10.2 with respect to one another therefore requires signal paths of ultrasonic signals to arrive in a central region of the transducer element of the receiving ultrasonic contact transducer 10.1 or 10.2. This is true of misalignments in a plane containing the measuring tube axis, as shown here, and of misalignments with respect to planes perpendicular to this plane.

Figure 6:
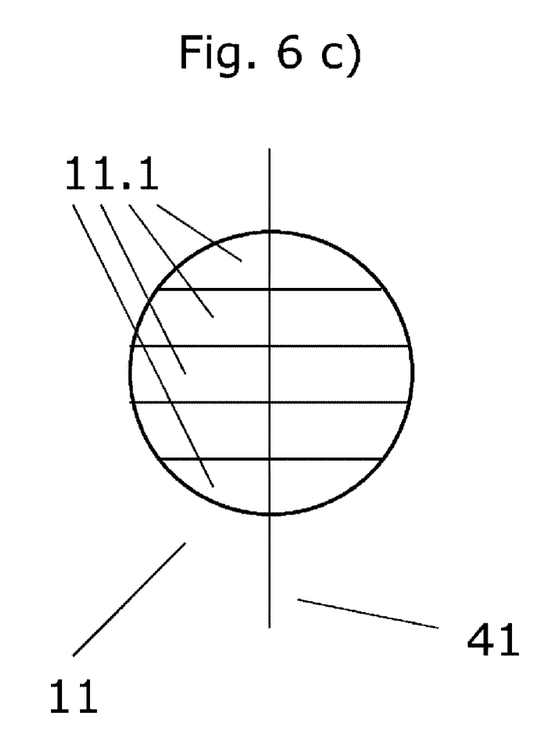

FIGS. 6 *a*) through *c*) represent exemplary embodiments of a transducer element 11, wherein FIG. 6 *a*) shows a disk-shaped transducer element, and wherein FIGS. 6 *b*) and 6*c*) show transducer elements 11 constructed by means of segments 11.1, wherein the transducer element in FIG. 6 *b*) is constructed from several angular segments, and the transducer element in FIG. 6 *c*) is constructed by means of several linear segments. The number of segments is at least 2 and at most one googolplex. It is advantageous if individual segments of a transducer element are separately electrically controlled.

A transducer element as in FIG. 6 *a*) is simple to produce, but has the disadvantage that faulty adjustment, as shown in FIG. 5 for example, leads only to signal attenuation and/or signal distortion, especially, temporal signal broadening of an ultrasonic signal. Therefore, an ultrasonic signal received from such a piezoelectric element carries no information about a possible misalignment. In a transducer element as in FIGS. 6 *b*) and *c*) with separate electrical control of the segments, misalignment leads to a time-separated response by the individual segments to an incoming ultrasonic signal and can be used to adjust the ultrasonic contact transducers by reducing the temporal separation of the response. A transducer element as in FIG. 6 *b*) shows good angular resolution, while a transducer element as in FIG. 6 *c*) shows good resolution in a linear direction.

The invention claimed is:

1. A clamp-on ultrasonic flowmeter comprising:
a measuring tube for guiding a medium;
a pair of ultrasonic contact transducers which, along a measuring tube axis, are arranged on the measuring tube offset from each other;
an electronic measuring/operating circuit for operating the ultrasonic contact transducers and for generating flow measurement values of the medium,
wherein each ultrasonic contact transducer has at least one transducer element for generating and detecting ultrasonic signals and a coupling element,
wherein the transducer element is located on a first side of the coupling element, said side facing away from the measuring tube, and wherein the coupling element is designed to be acoustically coupled to the measuring tube via a second side of the coupling element, said second side facing the measuring tube, and to transmit ultrasonic signals between the transducer element and measuring tube and vice versa,
wherein the ultrasonic flowmeter, for at least one first ultrasonic contact transducer of the pair, has an adjusting device for adjusting the ultrasonic contact transducer,
wherein the adjusting device is arranged between the transducer element and the first side of the coupling element or between the measuring tube and the second side of the coupling element, and has a coupling face directed towards the measuring tube,
characterized in that the adjusting device is configured to modify at least one angle of a signal path with respect to the coupling face and/or a signal path length, wherein the adjusting device has at least two degrees of freedom,
wherein the adjusting device is acoustically and mechanically coupled to the coupling element and the transducer element or measuring tube;
wherein the adjusting device has a deformable element and a deformation device,
wherein the shape of the deformable element is directly or indirectly adjustable by the deformation device,
wherein the deformation device is a screw device or an actuator device.

2. The flowmeter of claim 1,
wherein the adjusting device has at least three degrees of freedom.

3. The flowmeter of claim 1,
wherein a first degree of freedom makes it possible to tilt the signal path by a first angle, relative to the coupling face, in a first plane perpendicular to the coupling face,
or wherein a second degree of freedom makes it possible to tilt the signal path by a second angle, relative to the coupling face, in a second plane perpendicular to the coupling face,
or wherein a third degree of freedom makes it possible to set the signal path length.

4. The flowmeter of claim 3,
wherein the first plane contains the measuring tube axis.

5. The flowmeter according to claim 1,
wherein the flowmeter has the adjusting device for each ultrasonic contact transducer of the pair.

6. The flowmeter of claim 1,
wherein the transducer element is segmented into segments, each segment being individually controllable, wherein the segmentation is an angular segmentation or a linear segmentation along the measuring tube axis.

7. The flowmeter of claim 1,
wherein the actuator device has at least one piezoelectric element,
wherein the piezoelectric element is arranged in an edge region of the deformable element.

8. The flowmeter of claim 1,
wherein the deformation device has a plate-shaped element which is arranged on a side, facing the transducer element, of the adjusting device.
9. The flowmeter of claim 1,
wherein the adjusting device has at least two wedges,
wherein the wedges are acoustically and mechanically coupled via an inner end face in each case,
wherein a first wedge is acoustically and mechanically coupled to the coupling element via an outer end face and wherein a second wedge is acoustically and mechanically coupled to the transducer element or the measuring tube via an outer end face,
wherein the wedges are mounted such that they can rotate relative to one another and relative to the transducer element or the measuring tube and the coupling element.
10. The flowmeter of claim 1,
wherein acoustic impedances of the transducer element, the coupling element, and the adjusting device deviate from one another by less than 50%, wherein, a sequence of the impedances along a signal path through the transducer element, the coupling element, and the adjusting device is monotonically decreasing or monotonically increasing.
11. The flowmeter of claim 1,
wherein the measuring/operating circuit is configured to operate the adjusting device and to adjust the flowmeter during the measurement operation.

\* \* \* \* \*

UNITED STATES PATENT AND TRADEMARK OFFICE
CERTIFICATE OF CORRECTION

| | |
|---|---|
| PATENT NO. | : 11,448,538 B2 |
| APPLICATION NO. | : 16/956503 |
| DATED | : September 20, 2022 |
| INVENTOR(S) | : Achim Wiest et al. |

It is certified that error appears in the above-identified patent and that said Letters Patent is hereby corrected as shown below:

On the Title Page

Title at item (54) and in the Specification, Column 1, Lines 1-5:
After "FLOWMETER" delete the words "AND METHOD FOR ADJUSTING TRANSDUCER ELEMENTS USING AN ADJUSTING DEVICE HAVING AT LEAST TWO DEGREES OF FREEDOM."

Signed and Sealed this
Third Day of January, 2023

Katherine Kelly Vidal
*Director of the United States Patent and Trademark Office*